United States Patent
Wu et al.

(10) Patent No.: US 8,054,594 B2
(45) Date of Patent: Nov. 8, 2011

(54) ARC FLASH DETECTION SYSTEM

(75) Inventors: Juntao Wu, Niskayuna, NY (US); Renato Guida, Wynantskill, NY (US); Hua Xia, Altamont, NY (US); Chun Zhan, Niskayuna, NY (US); John Thomas Garrity, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 138 days.

(21) Appl. No.: 12/486,775

(22) Filed: Jun. 18, 2009

(65) Prior Publication Data

US 2010/0321838 A1 Dec. 23, 2010

(51) Int. Cl.
*H02H 3/16* (2006.01)

(52) U.S. Cl. .......................... 361/42; 361/44

(58) Field of Classification Search ............... 361/42–50
See application file for complete search history.

(56) References Cited

U.S. PATENT DOCUMENTS

| | | | |
|---|---|---|---|
| 4,158,169 A | 6/1979 | Harrold et al. | |
| 4,369,364 A | 1/1983 | Kuntermann | |
| 4,685,018 A | 8/1987 | Tada et al. | |
| 4,702,553 A | 10/1987 | Buchmuller et al. | |
| 5,075,629 A | 12/1991 | Umemura et al. | |
| 5,530,366 A | 6/1996 | Nasrallah | |
| 5,650,902 A | 7/1997 | Herkenrath et al. | |
| 5,706,154 A | 1/1998 | Seymour | |
| 5,903,427 A | 5/1999 | Roby | |
| 5,940,547 A | 8/1999 | Schumacher et al. | |
| 6,229,680 B1 | 5/2001 | Shea | |
| 6,693,438 B2 | 2/2004 | Shea | |
| 7,071,701 B2 | 7/2006 | Roman et al. | |
| 2008/0075404 A1 | 3/2008 | Chin et al. | |
| 2008/0094612 A1* | 4/2008 | Land | 356/51 |
| 2009/0161272 A1* | 6/2009 | Asokan et al. | 361/43 |

FOREIGN PATENT DOCUMENTS

| | | |
|---|---|---|
| DE | 29502452 U1 | 6/1996 |
| EP | 1538722 A2 | 6/2005 |

OTHER PUBLICATIONS

J.A. Cosgrave, J.W. Spencer, G.R. Jones, K.G. Lewis, W.B. Hall; "An Optical Fibre-Based Acoustic Sensor for Detecting Electrical Discharges in SF6 Puffer Circuit Breakers"; Seventh International Conference on Dielectric Materials Measurements & Applications, 2S26 Sep. 1996 Conference Publication No. 430, @ IEE 1996; pp. 307-312.

Muhammad A. Saqib, Anthony D. Stokes; "Time resolved spectrum of the fuse arc plasma"; Thin Solid Films 345 (1999) 151-155.

Michael Laux and Heinz Pursch; "Sound Emission From an Arc Cathode"; IEEE Transactions on Plasma Science, vol. 29, No. 5, Oct. 2001; pp. 722-725.

E. Restrepo and A. Devia; "Optical emission diagnostic of a pulsed arc discharge"; J. Vac. Sci. Technol. A 22(2), Mar./Apr. 2004, 377-382.

Zhimin Zhao, Linfeng Guo, Yongfei Hou, Junyan Ma, Kaisheng Wang; "A novel photoelectric system for optical intelligent structure health monitoring"; Smart Structures, Devices, and Systems III, edited by Said F. Al-Sarawi, Proc. of SPIE vol. 6414, 64141I, (2007); 5 Pages.

PCT International Search Report dated Oct. 19, 2010 and Written Opinion.

* cited by examiner

*Primary Examiner* — Danny Nguyen
(74) *Attorney, Agent, or Firm* — Jason K. Klindtworth (57) ABSTRACT

An apparatus to detect arc is presented. The apparatus includes a fiber sensor to detect characteristics of an arc flash and a processor to process at least two characteristics of the arc flash. The processor is further configured to generate an arc fault signal. A protective device is configured to mitigate the arc flash based on the arc fault signal.

22 Claims, 9 Drawing Sheets

ARC FLASH DETECTION SYSTEM

BACKGROUND

The invention generally relates to arc flash detection, particularly to arc detection using multiple parameters of an arc flash.

Electric power circuits and switchgear have conductors separated by insulation. Air space often serves as part or all of this insulation in some areas. If the conductors are too close to each other or voltage exceeds the insulation level, an arc can occur between conductors. Air or any other insulation (gas, solid, or liquid) between conductors can become ionized, making the insulation conductive thereby enabling an arcing event. Arc event induces temperatures that can reach as high as 20,000° C., vaporizing conductors and adjacent materials, and releasing an explosive energy that destroys surrounding circuits.

Arc flash is the result of a rapid energy release due to an arcing fault between phase-phase, phase-neutral, or phase-ground. An arc flash can produce high heat, intense light, pressure waves, and sound/shock waves similar to that of an explosion. However, the arc fault current is usually much less in magnitude as compared to short circuit current, and hence delayed or no tripping of circuit breakers is expected unless the breakers are selected to handle an arc fault condition. Typically, arc flash mitigation techniques use standard fuses and circuit breakers. However, such techniques have slow response times and are not fast enough to mitigate an arc flash.

One other technique to mitigate arc fault is to detect specific characteristics of the arcing event such as light. Optical sensors detect light within an enclosure and determine the occurrence of the arc flash event. However, such a method of light detection may lead to erroneous arc detection when stray light or light from other sources is detected. Further, such methods do not provide location of the arcing event. Other techniques include implementing pressure sensors within the enclosure to detect arc flash induced pressure change. Such methods, however, result in delayed detection as pressure build-up takes a significant amount of time after the actual arc flash has occurred. Early detection of the arc flash from pressure sensor may also be limit by bandwidth and sensitivity thereby not capturing the arcing event that is beyond the pressure sensor response range.

There is a need for improved arc flash prevention mechanism that has an improved response time and avoid false alarm.

BRIEF DESCRIPTION

Briefly, an apparatus to detect arc is presented. The apparatus includes a fiber sensor to detect characteristics of an arc flash and a processor to process at least two characteristics of the arc flash. The processor is further configured to generate an arc fault signal. A protective device is configured to mitigate the arc flash based on the arc fault signal.

In another embodiment, an arc detection system is presented. The arc flash detection system includes multiple fiber sensing module to detect one or more characteristics of an arc flash. The arc flash detection system further includes an optical splitter coupled to the fiber sensing modules and multiple filters coupled to the optical splitter. A processor is coupled to the filters and configured to generate an arc fault signal based on detect one or more arc flash characteristics.

In another embodiment, an arc flash detection system having a plurality of fiber sensing modules disposed in a plurality of locations in an electrical distribution system is proposed. The fiber sensing modules are configured to detect one or more characteristics of an arc flash. The arc flash detection system further includes a plurality of optical splitters to split the arc flash characteristics and a processor to compute a location of the arc flash and generate an arc fault signal. Based on the arc fault signal a protective device is configured to interrupt power supply to the electrical distribution system.

In another embodiment, an intelligent grid is proposed. The intelligent grid includes an electrical distribution system coupled to the grid and comprising a plurality of devices electrically coupled to perform a pre-determined function. A remote diagnostic system is coupled to the grid to monitor one or more characteristics of the grid. The intelligent grid further includes an arc detection system comprising a plurality of fiber sensing modules disposed in multiple locations in the electrical distribution system, wherein the fiber sensing modules detect one or more characteristics of an arc flash. A processor is coupled to the plurality of fiber sensors to generate an arc fault signal and mitigate the arc flash.

In another embodiment, an arc flash detection system is presented. The system includes fiber sensors to detect at least one of a light, an acoustic, and a thermal characteristic of an arc flash. A processor to analyze two or more characteristics of an arc flash and generate an arc fault signal based on two or more characteristics of an arc flash is coupled to the fiber sensors. The arc flash is mitigated based on the arc fault signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
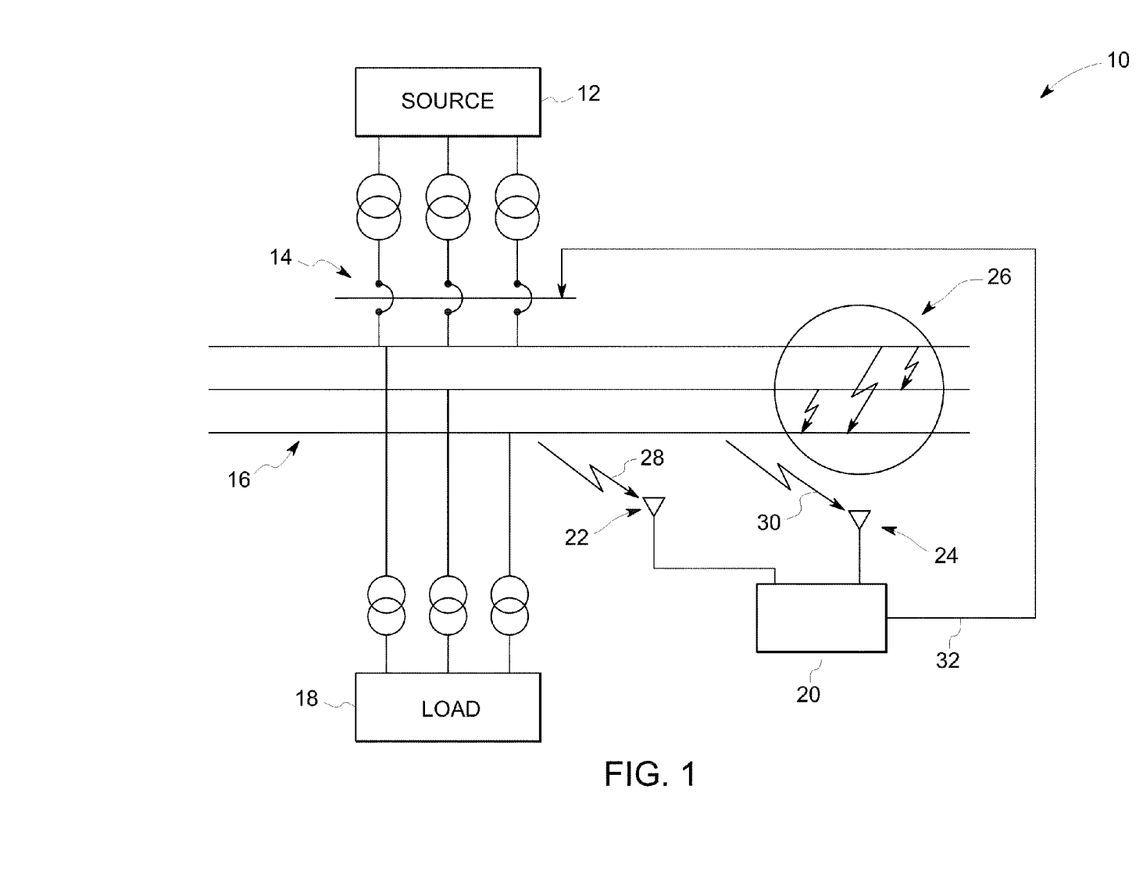
FIG. 1 is a schematic diagram of an exemplary electrical distribution system.

FIG. 1 is a schematic diagram of an exemplary electrical distribution system. Electrical distribution system 10 includes an electrical power source 12, protective device 14, bus bars 16 and load 18. In an exemplary embodiment an arc flash detection system 20 is implemented in the electrical distribution system 10. Fiber sensors 22 and 24 are coupled to the arc flash detection system 20 and configured to detect an arc flash event 26. An example of an electrical power source 12 includes a generator configured to deliver electrical power through a protective device 14 to bus bars 16. An example of a protective device 14 includes a circuit breaker that may be operated through electrical command signals. A load 18 receives electrical power from the source 12 via the bus bars 16.

An arc flash may occur in any location of the system 10 between at least two current carrying bus bars/conductors. Further the arcing event may occur between current carrying bus bars/conductor and ground or a neutral conductor. The location of arc flash occurrence may generally be categorized as a closed location or an open location. Closed locations may include panel boards or enclosed switchgear panels or the electrical distribution system. Open locations are regions that are exposed to the environment outside the enclosure, such as the bus bars or electrical leads that connect the switchgear or panels from the electrical source to the load. Arcing faults occur largely due to the lack of clearance between phase conductors, or between phase and ground conductors. Clearance may be affected by several factors, including environmental conditions (e.g., humidity, or conducting particles in polluted environment), insulation failure, a foreign object between conductors (e.g., a tool dropped by a technician.)

An example of one such arc flash is illustrated by the reference numeral 26 that may emit light and other components (e.g., vaporized matter). The fiber sensors 22 and 24 are configured to detect one or more characteristics of the arc flash such as 28 and 30. Arc flash detection system 20 is configured to receive signals from the fiber sensors 28, 30, and process the signals further to verify an arcing event. The system 20 may be configured to generate an arc fault signal 32 indicative of arc flash. Signal 32 may be coupled to the protective device 14 that is capable of interrupting power to mitigate the arc flash.

In conventional systems, two categories of protective devices typically are used for mitigating the arc flash; series devices such as circuit breakers or fuses, and parallel devices such as a "crowbar" (that effectively provoke opening of a circuit.) The series devices are conventional and are not satisfactory due to their slow reaction and operation time. The crowbar devices suffer from similar drawbacks, and may actually establish harmful faults. Furthermore, such conventional systems detect any one characteristic of the arc flash to trigger an alarm. However, relying on any one characteristic may lead to erroneous arc flash detection and cause false alarm and tripping. Embodiments disclosed herein process various parameters of arc flash to categorize an actual arc flash.

Fiber sensors such 22 and 24 may be disposed in a plurality of locations in the electrical distribution system 10. Although two such sensors or sensing modules are discussed in the present description, more or fewer sensors/modules may be employed. As used herein, the term "electrical distribution system" includes a plurality of devices electrically or optically coupled to perform a pre-determined function such as AC-DC drives, variable frequency drives to name a few. Further, "electrical distribution system" may embody other electrical sub-systems having electrical devices configured for control or power delivery.

Figure 2:
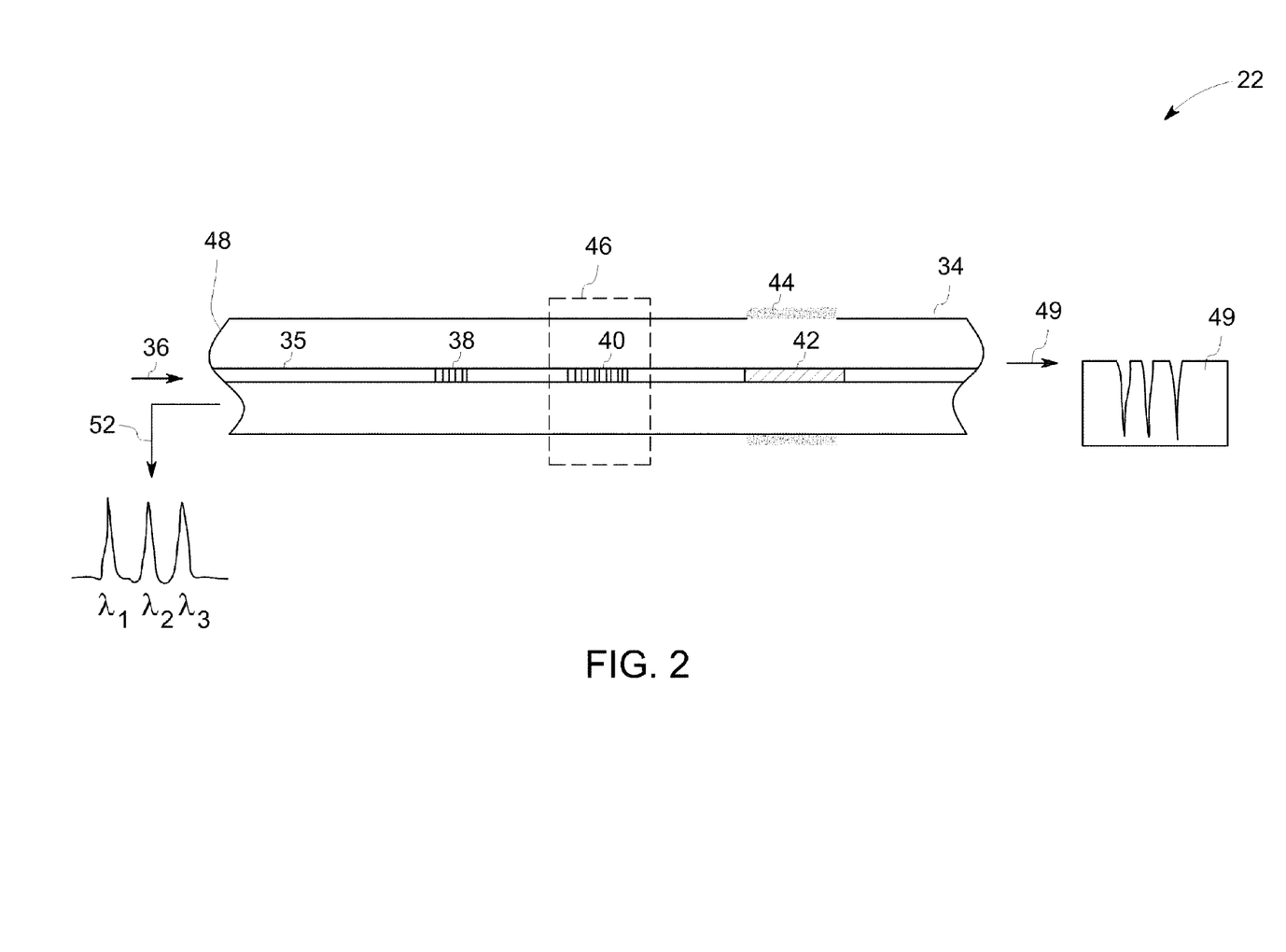
FIG. 2 illustrates an embodiment of a fiber sensing module implemented in the electrical distribution system of FIG. 1.

Turning now to FIG. 2, an embodiment of fiber sensor implemented in the electrical distribution system of FIG. 1 is illustrated. According to an exemplary embodiment, the fiber sensor 22 includes a fiber optic core 35 and an outer shield 34. The fiber core 35 is configured to receive an input light 36. One or more fiber Bragg gratings are inscribed within the fiber core 35. Such fiber Bragg gratings may be configured individually as a fiber thermal sensor 38, a fiber acoustic sensor 40, and a fiber light sensor 42. In one embodiment, the fiber Bragg grating is configured to reflect a particular wavelength of light and transmit the rest as transmitted light 49. In the illustrated embodiment, each grating is configured to reflect a particular wavelength, for example, fiber light sensor 42 is configured to reflect a characteristic wavelength $\lambda_3$ of the input light 36 and transmit the rest. Similarly, fiber thermal sensor 38 and a fiber acoustic sensor 40 are configured to reflect respectively, characteristic wavelengths $\lambda_1$, $\lambda_2$. In one embodiment, the outer shield 34 around the fiber light sensor 42 is coated with a polymer 44 that is sensitive to ultraviolet light. In another embodiment, the outer shield 34 around the fiber acoustic sensor 40 includes a pressure differential package 46 as will be explained in greater detail below.

In one embodiment, each fiber sensor (38, 40, or 42) may be configured to detect arc flash. A combination of two or three of such fiber sensors (38, 40, 42) may be configured as a fiber sensing module. Such sensing module will simultaneously measure transient variations of thermal, acoustic and light from arcing event, and thereby mitigate arc flash. Furthermore, sensing more than one parameter to mitigate arc flash reduces erroneous arc flash detection. In another embodiment, the fiber sensing module provides redundancy and hence reliability in the event of failure of one of the fiber sensors.

In an exemplary operation, the input light 36 characterized by a broad wavelength is incident on the fiber core 35. The sensors 38, 40, 42 reflect input light characteristics such as wavelength, intensity among others. Such reflected parameters are measured at the input 48 by analyzing reflected light 52. Alternatively, the transmitted light 49 may also be analyzed to detect arc flash. In an exemplary embodiment, the central wavelength of each fiber sensor (38, 40, 42) is determined by the equation $\lambda = 2 \cdot n \cdot \Lambda$, where n is the effective refractive index of the fiber optic core 35, and $\Lambda$ is the periodicity of a grating modulation. Each grating (38, 40, 42) is configured for a specific periodicity that defines a central wavelength (for example $\lambda_1$, $\lambda_2$, $\lambda_3$) in the reflection spectrum.

Figure 3:
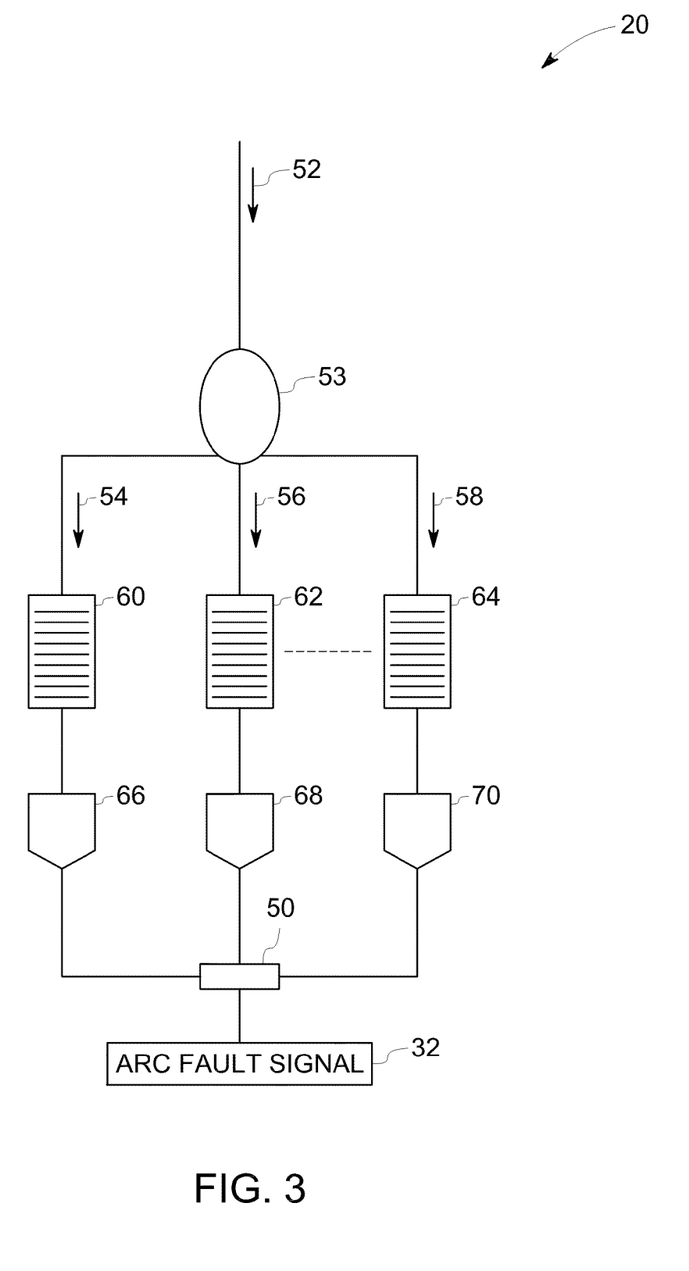
FIG. 3 illustrates an exemplary arc flash detection system implemented in the electrical distribution system of FIG. 1.

FIG. 3 illustrates an exemplary arc flash detection system implemented in the electrical distribution system of FIG. 1. The arc flash detection system 20 includes an optical splitter 53 configured to receive reflected light 52. In one embodiment, the reflected light 52 is split evenly based on the intensity into at least three signals 54, 56, and 58. Each signal 54, 56, and 58 includes all the characteristic wavelengths $\lambda_1$, $\lambda_2$, and $\lambda_3$. Filters such as band pass filters 60, 62, and 64 are configured to detect the individual wavelength $\lambda_1$, $\lambda_2$, and $\lambda_3$. Photo detectors 66, 68, and 70 coupled to the filters are configured to measure the optical intensity of signals from each filter 60, 62, and 64. A processor 50 coupled to the photo detectors 66, 68, 70 is configured to analyze the characteristic wavelength and detect thermal, acoustic, and light characteristics of the arc flash. Based on at least two of the above-mentioned parameters, the processor 50 generates an arc fault signal 32. As will be appreciated, using at least two parameters reduces false detection. For example, the fiber sensor may detect a stray light (from a flash light.) However, such an event may not be accompanied by pressure variation or thermal changes. Thus relying on at least two parameters would reduce false detection of the arc flash.

Figure 4:
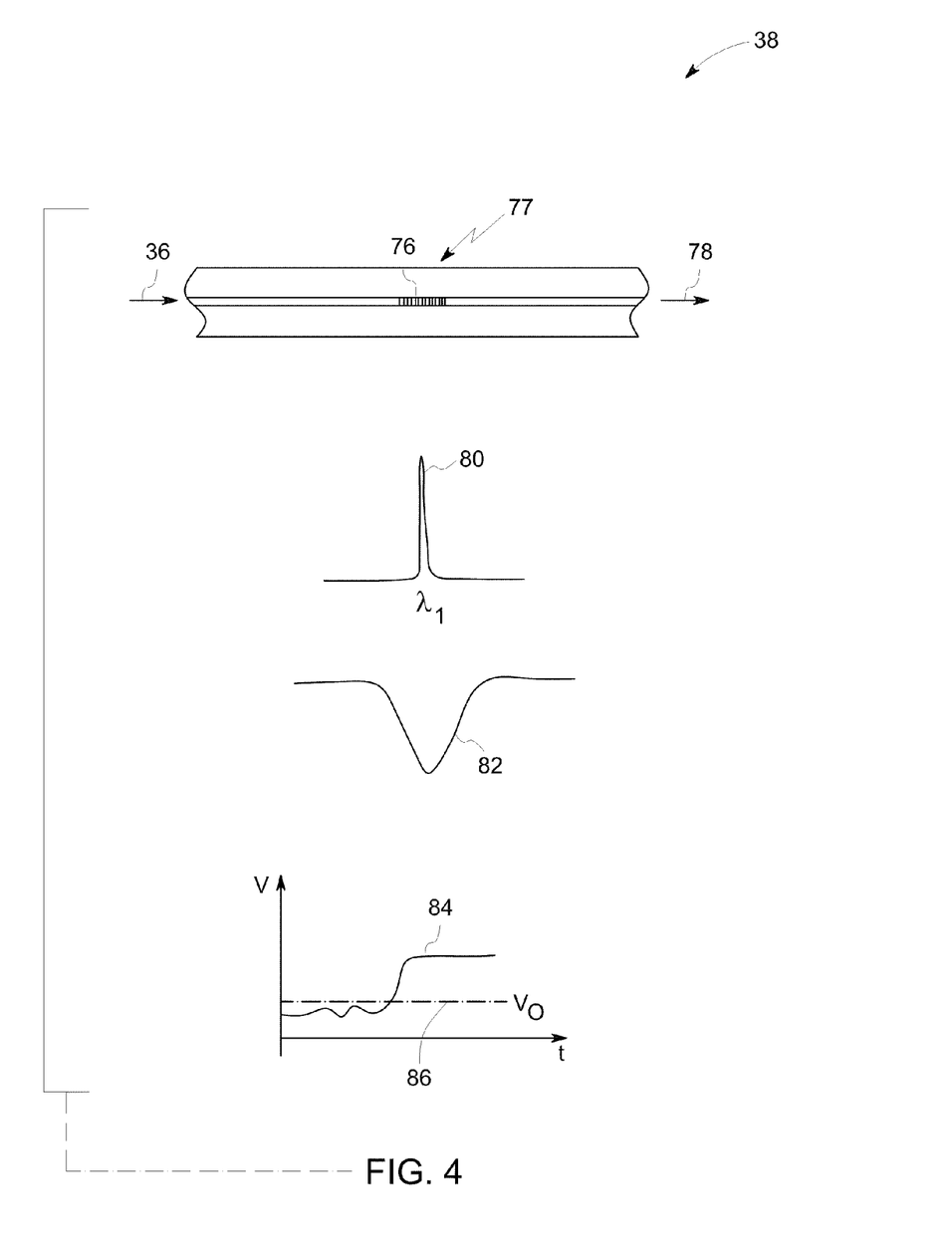
FIG. 4 illustrates fiber thermal sensor implemented in FIG. 2.

An arc flash typically emits light, sound, and an increase in temperature. Detecting each such parameter using fiber sensors are discussed in FIGS. 4-6. FIG. 4 illustrates fiber thermal sensor implemented in FIG. 2. The fiber thermal sensor 38 (configured as a temperature monitor) includes a fiber Bragg grating 76 configured to reflect a characteristic wavelength $\lambda_1$ of the incident light 36 and transmit the rest of the wavelength as output light 78. For example, an arc flash 77 incident proximate the grating 76 causes a change in temperature. The central wavelength $\lambda_1$ of the fiber thermal sensor 38 will be shifted up by $\Delta\lambda=\kappa\cdot\Delta T$, where temperature sensitivity $\kappa$ is about 12 pm/° C. and $\Delta T$ is the change in temperature. The fiber thermal sensor 38 is configured to have a central wavelength $\lambda_1$ close to the central wavelength of the filter 60 as referenced in FIG. 3, such that arc flash (77) induced temperature change will increase the signal strength from the thermal sensor 38. Such variation in temperature results in a characteristic reflected light 80. The reflected light 80 is filtered via a narrow band pass filter (such as filter 60 referenced in FIG. 3.) having a bandwidth 82 greater than the reflected light 80. For convenience of analytics, the filtered reflected light is converted to a corresponding electrical voltage 84. The converted electrical voltage is compared with a threshold voltage 86 to determine a temperature change. For example, if the converted electrical voltage 84 is greater than the threshold voltage 86 in amplitude, a positive temperature change is detected.

Figure 5:
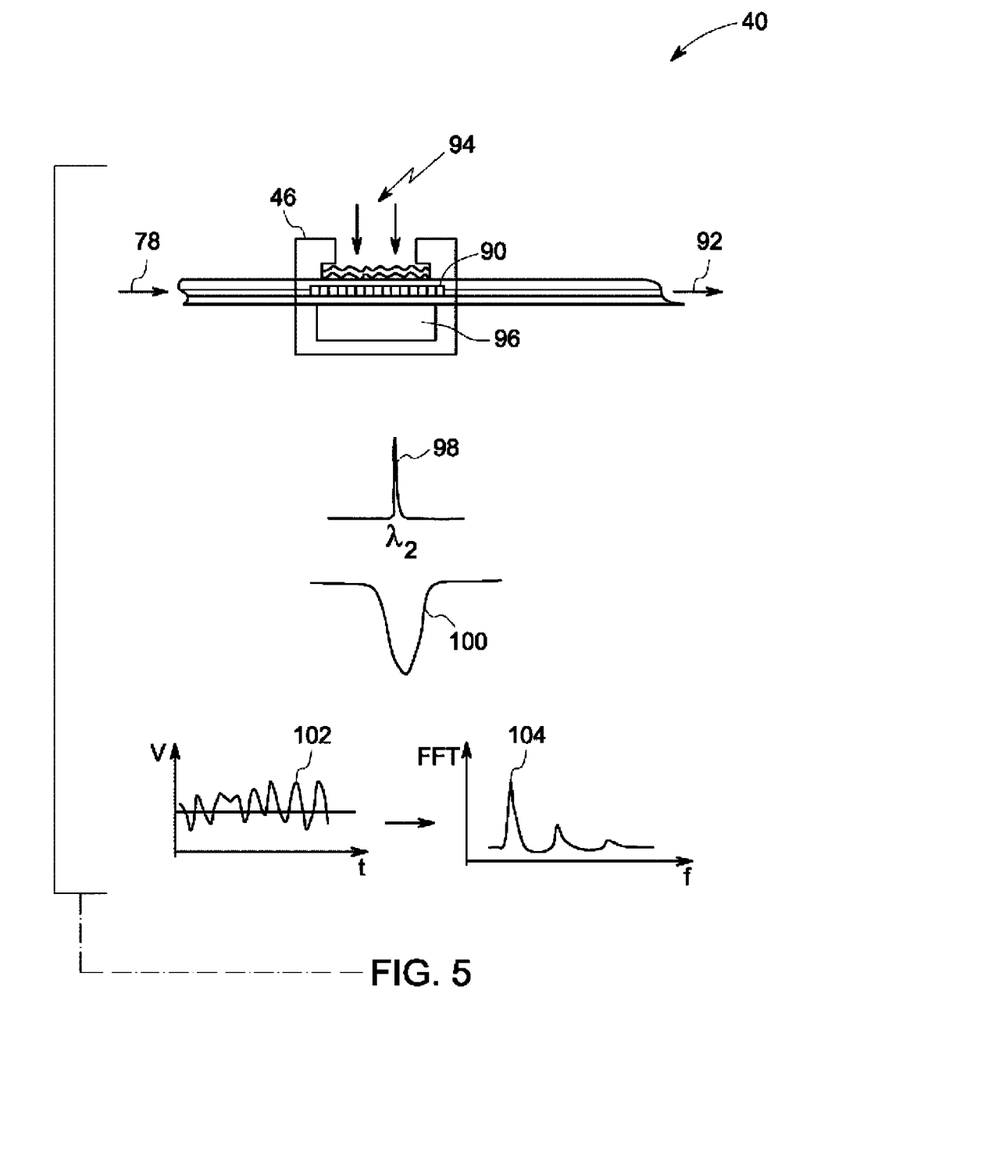
FIG. 5 is a detailed view of the fiber acoustic sensor implemented in FIG. 2.

FIG. 5 is a detailed view of the fiber acoustic sensor implemented in FIG. 2. The fiber acoustic sensor 40 (configured as a pressure sensor) includes a fiber Bragg grating 90 configured to reflect a characteristic wavelength $\lambda_2$ of the incident light 78 and transmit the rest of the wavelength as output light 92. It may be noted that the pressure differential package 46 disposed around the grating 90 is configured to detect pressure variations proximate the package 46. For example, an acoustic wave 94 originating from arc flash is incident on the package 46 causing a change in pressure. Such dynamic variation in pressure, P(t), is compared with a base pressure 96 (inside the enclosure 46, $P_o$) that result in a characteristic reflected light 98. The reflected light 98 is filtered via a narrow band pass filter (such as filter 62 referenced in FIG. 3.) having a bandwidth 100 greater than the reflected light 98. Pressure variations are induced with difference in pressure $\Delta P$ between the inside and outside the package 46. Such variations in pressure change the central wavelength $\lambda_2$ of the fiber acoustic sensor 40. For convenience of analytics, the filtered reflected light is converted to a corresponding electrical voltage 102. Since the central wavelength of the filter is fixed, the voltage 102 is converted into frequency-domain signal 104 that indicate arc flash signature frequency. The frequency domain signal 104 is indicative of the frequency of the acoustic wave from the arc flash such as 94 incident on the fiber acoustic sensor 40.

Figure 6:
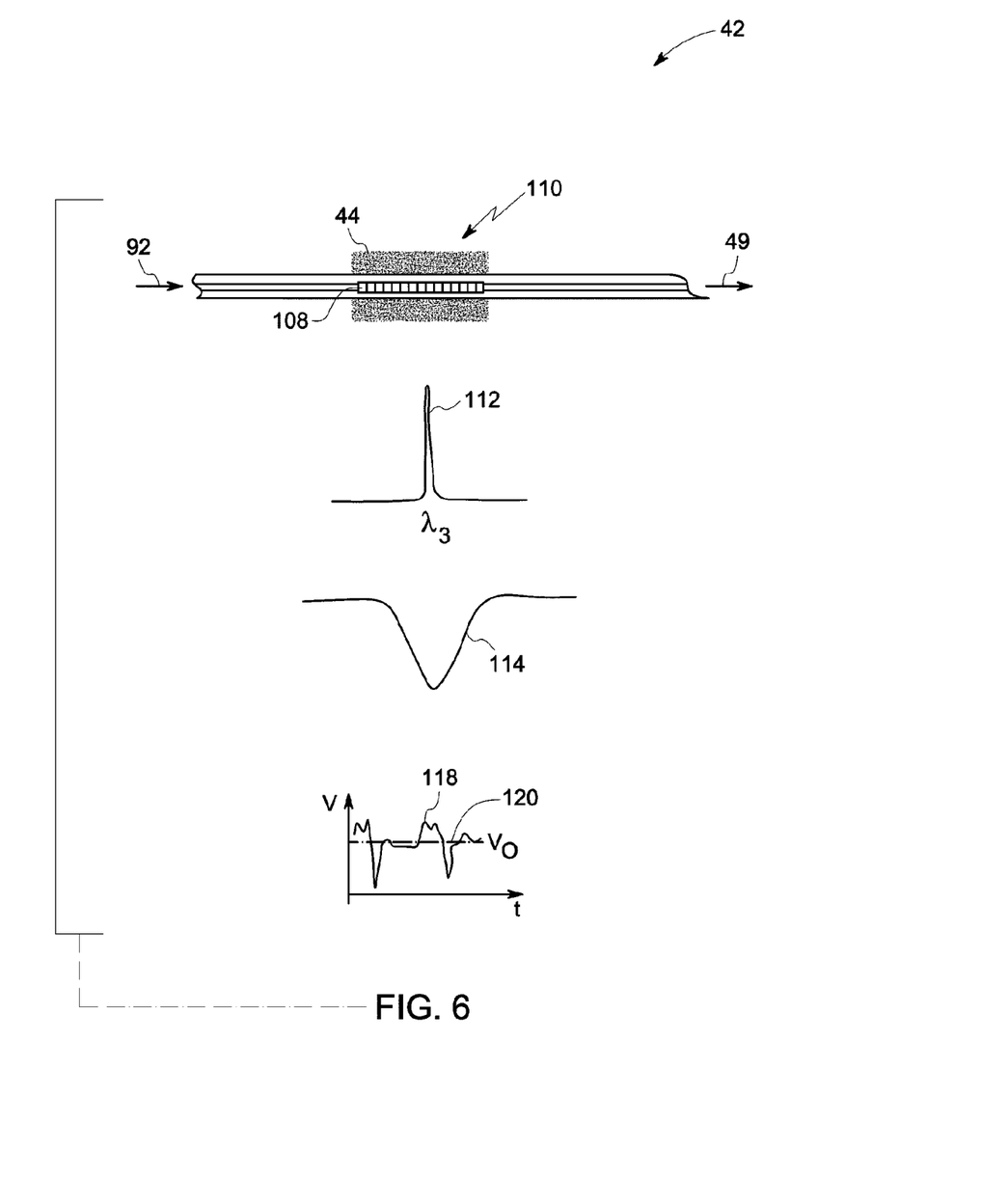
FIG. 6 is a detailed view of the fiber light sensor implemented in FIG. 2.

FIG. 6 is a detailed view of the fiber light sensor implemented in FIG. 2. The fiber light sensor 42 (configured as a light detector) includes a fiber Bragg grating 108 configured to reflect a characteristic wavelength $\lambda_3$ of the incident light 92 and transmit the rest of the wavelength as transmitted light 49. In an exemplary embodiment, a polymer 44 that is photosensitive to ultraviolet light is disposed around the grating 108. The refractive index of the photosensitive polymer 44 is configured to adapt from about $10^{-6}$ to about $10^{-3}$ upon exposure to ultraviolet light energy.

The fiber light sensor 42 is configured to respond to change in refractive index of photosensitive polymer 44. The input light 92 in a guided mode propagates along fiber core. In one embodiment, the fiber grating 108 is apodized and titled such that evanescent field energy is transmitted to adjacent fiber cladding region to form cladding mode transmission. The photosensitive polymer 44 is configured for a higher refractive index than fiber cladding such that the evanescent field energy of the guided mode can dissipate into photosensitive polymer layer 44 as radiation mode transmission. The variation of refractive index, induced by an arcing event, may affect coupling strength between the guided mode and cladding mode. Any variation in coupling strength change may modify the guided mode wavelength and include transmission loss. In an exemplary embodiment, to increase the coupling strength, a titled grating structure with apodized profile is implemented that help guide light energy to the cladding region. Such combination of tilted grating structure with apodized profile effectively expand evanescent field from the fiber core to fiber cladding. The ultraviolet light induced refractive index change will modulate the forward and backward guided mode coupling to effectively shift fiber sensor resonant wavelength. For example, light 110 originating from arc flash incident on the coating 44, will change the refractive index of the polymer coating material 44. Such change may be detected in the reflected light 112, that affect the central wavelength $\lambda_3$. The reflected light 112 is filtered via a narrow band pass filter (such as filter 64 referenced in FIG. 3) having a bandwidth 114 greater than the reflected light 112. For convenience of analytics, the filtered reflected light is converted to a corresponding electrical voltage 118. The converted electrical voltage is compared with a threshold voltage 120 to determine ultraviolet light. For example, if the converted electrical voltage 118 is greater than the threshold voltage 120 in amplitude, the presence of ultraviolet light is confirmed.

Figure 7:
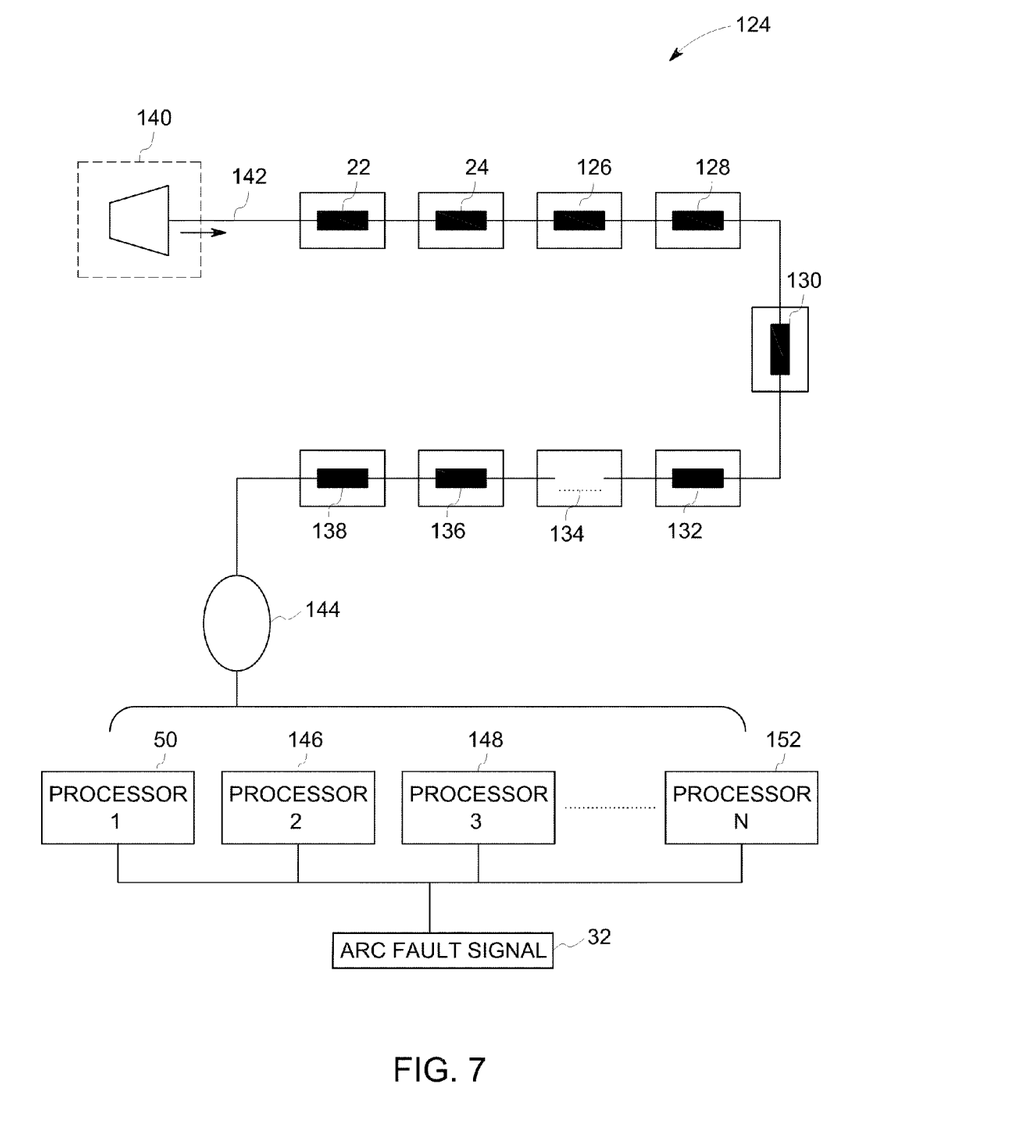
FIG. 7 illustrates an electrical distribution system having multiple enclosures and implementing arc flash detection system according to an embodiment of the invention.

FIG. 7 illustrates an electrical distribution system having multiple enclosures and implementing arc flash detection system according to an embodiment of the invention. The electrical distribution system 124 includes multiple fiber sensors 22, 24, 126-138 disposed in plurality of locations within multiple enclosures. Various detection configurations such as transmission and reflection may be implemented. In the illustrated embodiments, one such transmission-based detection is implemented. A light source 140 is configured to transmit light having characteristic wavelength through the fiber optic core 142. Multiple fiber sensing modules 22, 24, 126-138 having different grating fiber sensors as discussed in FIG. 2 are configured to detect multiple characteristics of the arc flash such as temperature, acoustic, and ultraviolet light. An optical splitter 144 splits the transmitted light 143 according to the multiple enclosures. Each split light is coupled to processor 50, 146-152 for further analysis (such as filtering and detecting characteristics.) In case of arc flash event, a protective device such as a circuit breaker is activated via the arc fault signal 32. By tracking the processor that generated the arc fault signal, the location of the arc flash can be determined.

Figure 8:
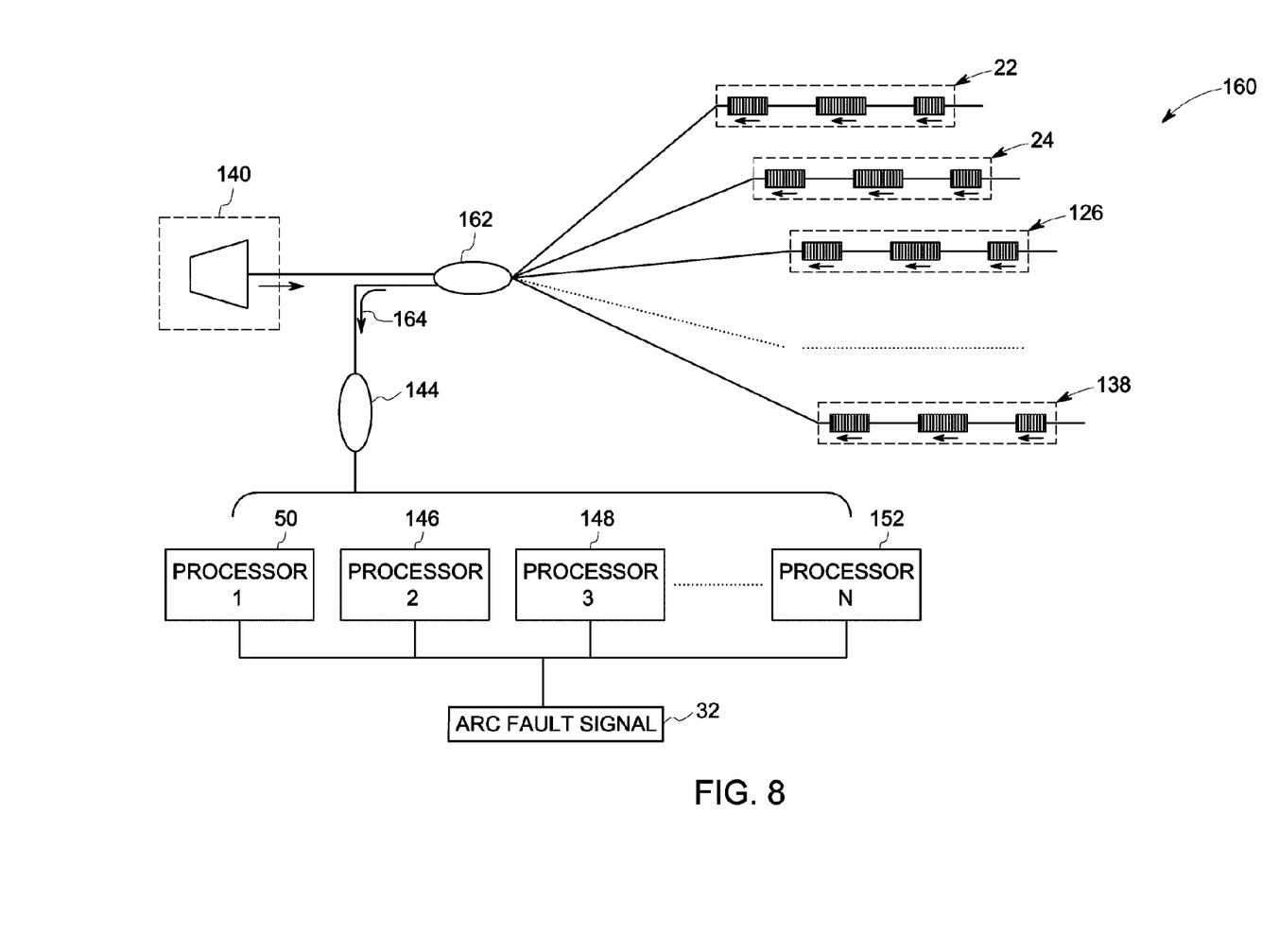
FIG. 8 illustrates an alternate topology of arc detection system according to an embodiment of the invention.

FIG. 8 illustrates an alternate topology of arc flash detection system based on reflection configuration. The electrical distribution system 160 includes multiple fiber sensors 22, 24, 126-138 disposed in plurality of locations within multiple enclosures. The light source 140 is configured to transmit light having characteristic wavelength through the fiber optic core 142. Multiple fiber sensors 22, 24, 126-138 having grating as discussed in FIG. 2 are configured to detect multiple characteristics of the arc flash such as temperature, acoustic, and ultraviolet light. An optical coupled 162 is implemented to collaborate all the reflected light signals from the multiple sensors 22, 224, 126-138. Further an optical splitter 144 splits the reflected light 164 according to the multiple enclosures. Each split light is coupled to processor 50, 146-152 for further analysis (such as filtering and detecting characteristics.) In case of arc flash event, a protective device such as a circuit breaker is activated via the arc fault signal 32. By tracking the processor that generated the arc fault signal, the location of the arc flash may be determined.

Figure 9:
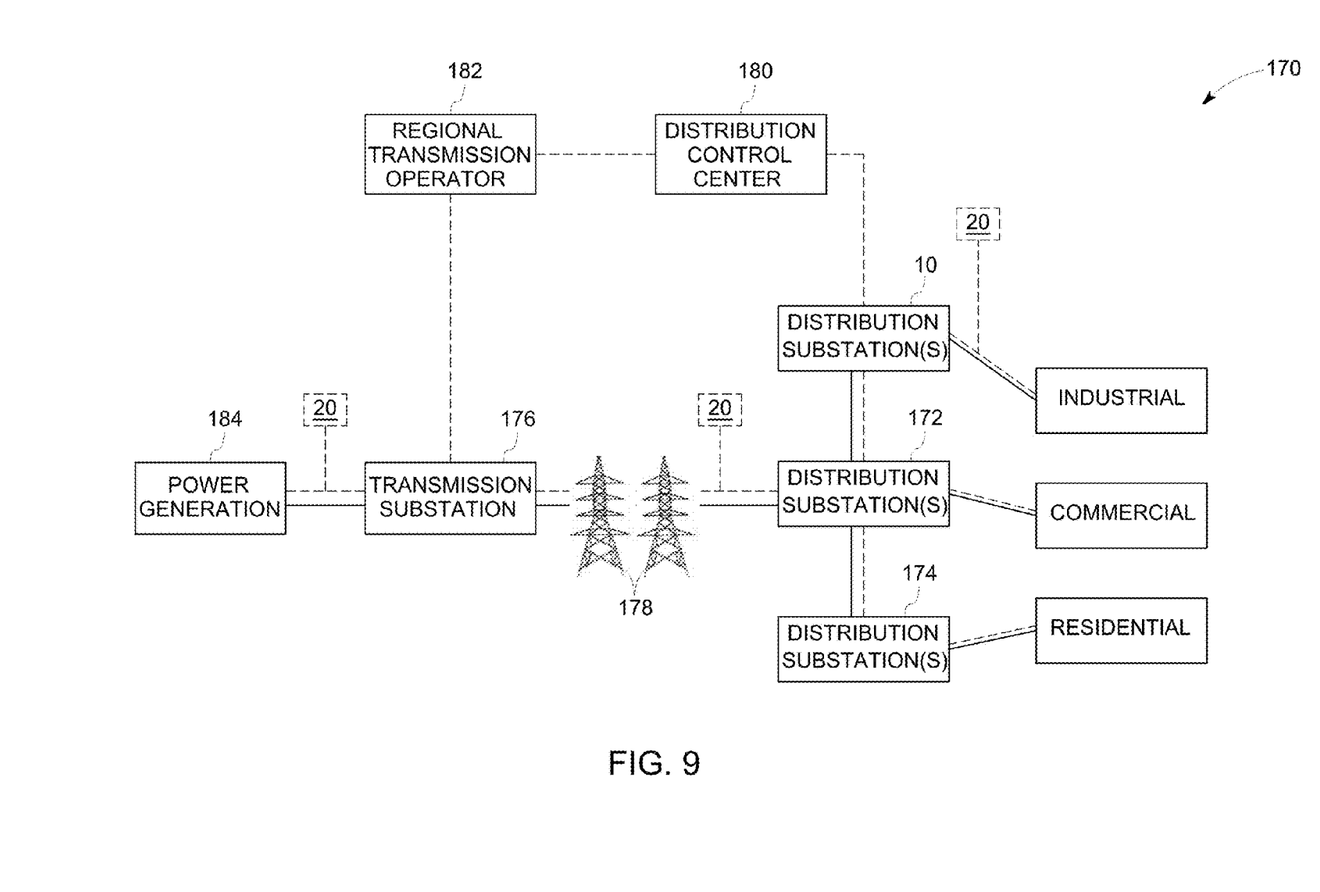
FIG. 9 illustrates an intelligent grid implementing arc flash detection system according to an aspect of the invention.

FIG. 9 illustrates an intelligent grid implementing arc detection system according to an aspect of the invention. The intelligent grid 170 includes one or more electrical distribution systems 10, 172, 174 coupled to the transmission station 176 via the transmission lines 178. Furthermore, the intelligent grid includes a communication network (illustrated by the dashed lines) interconnection to the electrical network with a remote diagnostic system 180 and a regional transmitter operator. In one example, the predetermined function of the electrical distribution system 10 includes receiving power from the transmission station (which receives power from the power generation station 184) and distribute to various industrial and residential load network. In one embodiment, the remote diagnostic system is configured to monitor one or more characteristics of the grid. Arc detection system 20 may be coupled to the grid at multiple locations. As discussed earlier, such arc detection systems implement a plurality of fiber sensors disposed in a plurality of locations in the electrical distribution system, wherein the fiber sensors detect one or more characteristics of an arc flash. In case arc flash is detected, a processor coupled to the plurality of fiber sensors generates an arc fault signal. The remote diagnostic system monitors the arc fault signal across a plurality of arc detection systems coupled to the grid. A regional transmission operator 182 may be enabled via the remote diagnostic system to identify the exact location of the fault in the grid.

Advantageously, embodiments disclosed herein, such as arc detection system implementing fiber sensors have fast response and cost effective. Detecting ultraviolet light reduces arc detection time, as ultraviolet light is one of the first to be emitted in the light spectrum. Further, arc detection systems implementing acoustic detection help detect precise location of the arc. Relying on at least two or more characteristics of arc flash for detection help reduce false alarm rate. Fiber detection systems have EMI immunity reducing external interference. By integrating the fiber detection system with grid based monitoring systems, health monitoring of the grid is possible.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus to detect arc comprising:
   a fiber sensing module comprising a plurality of fiber sensors configured as a combined unit to simultaneously detect a plurality of characteristics of an arc flash from a single location;
   a processor to process the plurality of characteristics of the arc flash and generate an arc fault signal;
   a protective device to mitigate the arc flash based on the arc fault signal.

2. The apparatus of claim 1 further comprising a splitter to split the plurality of characteristics of the arc flash detected by the plurality of fiber sensors.

3. The apparatus of claim 2 further comprising one or more filters coupled to the splitter.

4. The apparatus device of claim 1, wherein the plurality of characteristics of the arc flash comprise at least one of an ultraviolet light characteristic, a temperature characteristic, a pressure characteristic, and an acoustic characteristic.

5. The apparatus device of claim 4, wherein the plurality of characteristics are sensed in a plurality of locations.

6. The apparatus of claim 1, wherein the fiber sensing module comprises one or more of a fiber light sensor, a fiber thermal sensor, and a fiber acoustic sensor.

7. An arc flash detection system comprising:
   a fiber sensing module comprising a plurality of fiber sensors to detect a plurality of characteristics of an arc flash;
   an optical splitter coupled to the fiber sensing module;
   a plurality of filters coupled to the optical splitter;
   a processor coupled to the filters and configured to generate an arc fault signal based on the detection of the plurality of arc flash characteristics.

8. An arc flash detection system comprising:
   a plurality of fiber sensing modules disposed in a plurality of locations in an electrical distribution system, wherein the fiber sensing modules detect one or more characteristics of an arc flash;
   at least one optical splitter to split the arc flash characteristics;
   a processor to compute a location of the arc flash and generate an arc fault signal; and
   a protective device to interrupt power supply to the electrical distribution system based on the arc fault signal.

9. The arc detection system of claim 8, wherein the fiber sensing module comprises one or more of fiber light sensors, fiber thermal sensors, and fiber acoustic sensors.

10. The arc detection system of claim 9, wherein the fiber light sensor detects ultraviolet light.

11. The arc detection system of claim 9, wherein the fiber thermal sensor detects temperature.

12. The arc detection system of claim 9, wherein the fiber acoustic sensor detects dynamic pressure waves from the arc flash.

13. The arc detection system of claim 8, wherein the electrical distribution system is coupled to a grid.

14. The arc detection system of claim 13, wherein a remote diagnostic device is coupled to the grid.

15. An intelligent grid comprising:
   an electrical distribution system coupled to a grid and comprising a plurality of devices electrically coupled to perform a pre-determined function;
   a remote diagnostic system to monitor one or more characteristics of the grid; and
   an arc flash detection system comprising:
      a plurality of fiber sensing modules disposed in a plurality of locations in the electrical distribution system, wherein the fiber sensing modules detect one or more characteristics of an arc flash;
      a processor coupled to the plurality of fiber sensing modules to generate an arc fault signal and mitigate the arc flash.

16. The intelligent grid of claim 15, wherein the remote diagnostic system monitors the arc fault signal across a plurality of arc flash detection systems coupled to the grid.

17. The intelligent grid of claim 15, wherein the arc flash detection system further comprising an optical splitter and a filter coupled to the fiber sensing module.

18. The intelligent grid of claim 15, wherein the arc fault signal is indicative of the characteristics of the grid.

19. An arc flash detection system comprising:
   a fiber sensing module comprising a plurality of fiber sensors configured as a combined unit to simultaneously detect at least one of a light, an acoustic, and a thermal characteristic of an arc flash from a single location;
   a processor to analyze two or more characteristics of an arc flash and generate an arc fault signal based on two or more characteristics of an arc flash and to mitigate the arc flash based on the arc fault signal.

20. The fiber arc flash detection system of claim 19, wherein the processor further includes an optical splitter and a filter.

21. The fiber arc flash detection system of claim 19, further comprising a protective device coupled to the processor.

22. The fiber arc flash detection system of claim 21, wherein the protective device is configured to interrupt power.

* * * * *

UNITED STATES PATENT AND TRADEMARK OFFICE
CERTIFICATE OF CORRECTION

| | |
|---|---|
| PATENT NO. | : 8,054,594 B2 |
| APPLICATION NO. | : 12/486775 |
| DATED | : November 8, 2011 |
| INVENTOR(S) | : Wu et al. |

It is certified that error appears in the above-identified patent and that said Letters Patent is hereby corrected as shown below:

On the Title Page, Item (56), under "OTHER PUBLICATIONS", in Column 2, Line 5 delete "IEE" and insert -- IEEE --, therefor.

In Column 7, Line 59, in Claim 4, delete "apparatus device of" and insert -- apparatus of -- therefor.

In Column 7, Line 63, in Claim 5, delete "apparatus device of" and insert -- apparatus of --, therefor.

Signed and Sealed this
Twenty-fifth Day of September, 2012

David J. Kappos
*Director of the United States Patent and Trademark Office*